United States Patent
Li et al.

(10) Patent No.: US 10,149,145 B2
(45) Date of Patent: Dec. 4, 2018

(54) MAINTAINING INACTIVE ELECTRONIC SUBSCRIBER IDENTITY MODULES

(71) Applicant: Apple Inc., Cupertino, CA (US)

(72) Inventors: Li Li, Los Altos, CA (US); Arun G. Mathias, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/134,289

(22) Filed: Apr. 20, 2016

(65) Prior Publication Data
US 2016/0316356 A1  Oct. 27, 2016

Related U.S. Application Data

(60) Provisional application No. 62/150,649, filed on Apr. 21, 2015.

(51) Int. Cl.
*H04M 3/00* (2006.01)
*H04W 8/18* (2009.01)
*H04W 8/20* (2009.01)
*H04W 12/04* (2009.01)
*H04W 4/50* (2018.01)

(52) U.S. Cl.
CPC ............ *H04W 8/183* (2013.01); *H04W 4/50* (2018.02); *H04W 8/205* (2013.01); *H04W 12/04* (2013.01)

(58) Field of Classification Search
CPC .... G06F 1/1616; G06F 1/1624; G06F 1/1679; G06F 1/1681; Y10S 248/919; H04W 4/001; H04W 8/183; H04W 8/205

USPC .......................................................... 455/418
See application file for complete search history.

(56) References Cited

U.S. PATENT DOCUMENTS

| | | | |
|---|---|---|---|
| 2015/0146707 A1* | 5/2015 | Jung | H04W 88/06 370/338 |
| 2015/0237497 A1* | 8/2015 | Chen | H04W 8/183 455/558 |
| 2017/0238186 A1* | 8/2017 | Lee | H04W 12/08 726/1 |

OTHER PUBLICATIONS

"GSMA SAS Standard for Subscription Manager Roles," GSM Association, Version 1.0, Oct. 13, 2014, 31 pages.
(Continued)

*Primary Examiner* — Timothy Pham
(74) *Attorney, Agent, or Firm* — Dickinson Wright RLLP (57) ABSTRACT

This disclosure describes procedures for maintaining multiple electronic subscriber identity modules (eSIMs) within a user equipment (UE) device, in such a manner that an inactive eSIM can be maintained/updated at the UE device while an active eSIM is being utilized by the UE device to communicate with a corresponding network. The procedures include, a UE device establishing communications with a first network using an active eSIM, initiating an eSIM manager at the UE device, selecting an inactive eSIM (e.g., associated with a second network) with the eSIM manager, applying a profile update to the inactive eSIM with the eSIM manager during communications with the first network, and deselecting the inactive eSIM with the eSIM manager when the profile update to the inactive eSIM is complete. In some configurations, the eSIM manager and the multiple eSIMs can be stored within a secure element of the UE device.

20 Claims, 8 Drawing Sheets

(56) References Cited

OTHER PUBLICATIONS

"GSMA Embedded SIM Specification: Remote SIM Provisioning for M2M," GSM Association, Oct. 2014, 35 pages.
"Embedded SIM Remote Provisioning Architecture", GSM Association, Version 1.1, Dec. 17, 2013, 84 pages.
"Remote Provisioning Architecture for Embedded UICC Technical Specification," GSM Association, Version 2.0, Oct. 13, 2014, 293 pages.

* cited by examiner

MAINTAINING INACTIVE ELECTRONIC SUBSCRIBER IDENTITY MODULES

CROSS-REFERENCE TO RELATED APPLICATIONS

This Application claims the benefit of U.S. Provisional Application No. 62/150,649, entitled "MAINTAINING INACTIVE ELECTRONIC SUBSCRIBER IDENTITY MODULES", filed Apr. 21, 2015, the content of which is incorporated by reference herein in its entirety for all purposes.

FIELD

The described embodiments generally relate to the field of wireless communications. More particularly, the embodiments pertain to systems and methods for maintaining inactive electronic subscriber identity modules (eSIMs) at a user equipment (UE) device.

BACKGROUND

Recent advances in wireless communication technologies have resulted in an exponential increase in the demand for improved computing devices, consumer services, and communication bandwidth. To attempt to accommodate this growing demand, device manufacturers, service providers, and various intermediary entities, have been evolving in function by effectively changing the way they do business. One aspect of this change relates to the field of network access control. Generally, network access control involves a subscriber attempting to gain access to a network service(s) by providing access identity credentials to an authenticating network service provider for verification. In a scenario where the network service provider successfully verifies/authenticates the access identity of the subscriber based on the credentials provided, a corresponding level-of-access to network service(s) is granted for the subscriber.

By way of example, many global telecommunication service providers issue subscriber identity module (SIM) cards to their subscribers (or potential subscribers) to allow individual subscribers to insert the physical SIM card within their user equipment (UE) device(s) for the purpose of gaining access to the provider's network services, in accordance with a subscriber's service level agreement (SLA). As is known in the field, a SIM (which may also be referred to more specifically for different technologies as a USIM, ISIM, CSIM, etc.) is a component application of a universal integrated circuit card (UICC) "smart card," and this can be referred to collectively as a SIM card. In function, the SIM component securely stores an international mobile subscriber identity (IMSI), along with various cryptographic keys and other credentials, which can be used for network authentication.

The European Telecommunications Standards Institute (ETSI) and the Global System for Mobile Communications Association (GSMA) have been responsible for standardizing many hardware-based and software-based features, and improvements thereof, of modern SIM cards and devices. For example, the GSMA body recently proposed the use of an embedded UICC (eUICC) for the mobile machine-to-machine (M2M) industry. As is generally known in the field, M2M machines are designed to communicate with other M2M machines of the same type in a limited functional manner. However, modern telecommunications service providers and UE device manufacturers have tended to prefer the use of physical SIM cards for various practical reasons, including facilitating "hot-swapping" of an issued SIM card between two UE devices for the same mobile network operator (MNO), and facilitating hot-swapping of different MNO SIM cards in a UE device while roaming to a different geographic area, etc.

Nevertheless, the use of physical SIM cards leaves much to be desired for service providers and device manufacturers alike. For instance, it is difficult to update SIM card profile data without replacing a SIM card entirely, or necessitating a subscriber's visit to a local telecommunication service provider's storefront for assistance. Likewise, completely replacing a SIM profile of a SIM card is often impracticable. In many of these scenarios, significant additional costs are expended by service providers who are required to manufacture, procure, and/or reprogram, numerous physical SIM cards for routine subscriber activities (e.g., for subscribers roaming abroad, changing services or service providers, etc.) or for network infrastructure upgrades.

In consideration of the above-noted disadvantages, and others, it would be beneficial to employ a means for readily maintaining SIM data within a wireless communication device for one or multiple service providers. Further, it would be desirable to be able to transparently manage SIM resources at a UE device for both active and inactive SIM data, without negatively affecting/impacting UE device communications.

SUMMARY

This Summary is provided to introduce (in a simplified form) a selection of concepts that are further described below in the Detailed Description. This Summary is not intended to identify key features of the claimed subject matter, nor is it intended to be used as an aid in determining the scope of the claimed subject matter.

Various embodiments described herein provide for procedures that can maintain multiple electronic subscriber identity modules (eSIMs) stored within a user equipment (UE) device. Device processes necessary for carrying out these eSIM maintenance procedures are implemented in such a manner that they are essentially transparent to a user of the UE device. In this regard, one or more inactive eSIMs can be maintained and/or managed at the UE device at the same time that an active eSIM is utilized by the UE device to communicate with a corresponding mobile network operator (MNO).

In some aspects of the disclosure, the procedures may include, but are not limited to including, a UE device establishing communications with a first network using an active eSIM of the multiple eSIMs, initiating an eSIM manager at the UE device, selecting an inactive eSIM of the multiple eSIMs with the eSIM manager, applying a profile update to the inactive eSIM with the eSIM manager during communications with the first network, and then deselecting the inactive eSIM with the eSIM manager when the profile update to the inactive eSIM is complete. In various configurations, the eSIM manager and the multiple eSIMs can be stored within a secure element of the UE device.

In further aspects, a secure channel can be established between a host processor of the UE device and the secure element, prior to accessing any data stored within the secure element, to apply the profile update to the inactive eSIM in a secure manner. The secure channel may be an in-device communication channel that is otherwise inaccessible to other components (software and/or hardware) of the UE device, and more than one secure channel may be open between the host processor and the secure element at a time within the UE device.

In some embodiments, the profile update can correspond to one or more profile policy control function (PCF) updates of the inactive eSIM.

In other aspects, the procedures may include the UE device requesting the profile update from an eSIM server of a second network that is associated with the inactive eSIM, and in response to requesting the profile update, acquiring the profile update from the eSIM server of the second network. In this arrangement, the first network can correspond to a first MNO that provisioned the active eSIM to the UE device, and the second network may correspond to a second MNO that provisioned the inactive eSIM to the UE device.

Further, in some aspects, the procedures may include the UE device receiving the profile update from an eSIM server of a second network that is associated with the inactive eSIM, and in response to receiving the profile update from the eSIM server, establishing a secure channel between a host processor of the UE device and a secure element of the UE device storing the multiple eSIMs, to apply the profile update to the inactive eSIM in a secure manner.

In various configurations, the profile update can be applied to the inactive eSIM with the eSIM manager using a separate specification that defines the profile update, or alternatively, with corresponding command application protocol data units (APDUs) that are associated with the inactive eSIM.

In accordance with other aspects of the disclosure, a wireless communication device that is configured to maintain multiple eSIMs may include one or more processors, a secure element storing the multiple eSIMs, and a non-volatile computer-readable storage medium storing executable instructions. When the executable instructions are executed by the one or more processors, the wireless communication device may establish a secure channel between the one or more processors and the secure element, initiate an eSIM manager associated with an inactive eSIM of the multiple eSIMs at the wireless communication device, select the inactive eSIM and apply a profile update to the inactive eSIM with the eSIM manager, and then deselect the inactive eSIM with the eSIM manager when the profile update to the inactive eSIM is complete.

In some aspects, execution of the executable instructions can further cause the wireless communication device to establish communications with a first MNO using an active eSIM of the multiple eSIMs, and then apply the profile update to the inactive eSIM with the eSIM manager during communications with the first MNO. In this regard, the active eSIM may have been provisioned to the wireless communication device by an eSIM server of the first MNO, and the inactive eSIM may have been provisioned to the wireless communication device by an eSIM server of a second MNO.

In other aspects, execution of the executable instructions may cause the wireless communication device to request the profile update from a MNO associated with the inactive eSIM, and then acquire the profile update from the MNO associated with the inactive eSIM, in response to the request.

In some embodiments, execution of the executable instructions further causes the wireless communication device to receive the profile update from a MNO associated with the inactive eSIM. In this regard, the wireless communication device can establish the secure channel between the one or more processors and the secure element in response to receiving the profile update from the MNO associated with the inactive eSIM.

In various aspects, the profile update may correspond to one or more profile PCF updates of the inactive eSIM, and the one or more PCF updates can be applied to the inactive eSIM with the eSIM manager using a separate specification that defines the one or more PCF updates, or alternatively, with corresponding command Application Protocol Data Units (APDUs) that are associated with the inactive eSIM.

In accordance with other aspects of the disclosure, procedures for maintaining multiple eSIMs may include the UE device establishing communications with a first network using an active eSIM of multiple eSIMs, acquiring a replacement eSIM for an inactive eSIM of the multiple eSIMs, where the replacement eSIM and the inactive eSIM are associated with a second network, initiating an eSIM manager at the UE device, selecting and deleting the inactive eSIM with the eSIM manager, and then installing the replacement eSIM with the eSIM manager.

In some implementations, acquiring the replacement eSIM for the inactive eSIM further includes receiving the replacement eSIM from an eSIM server of the second network, and then establishing a secure channel between a host processor of the UE device and secure element of the UE device to install the replacement eSIM in a secure manner.

In one aspect, the eSIM manager and the multiple eSIMs, including the replacement eSIM, can be stored within the secure element of the UE device.

In accordance with various aspects, acquiring the replacement eSIM for the inactive eSIM may include deleting the inactive eSIM after verifying the functionality and/or appropriateness of the replacement eSIM. Further, in some configurations, the inactive eSIM and the replacement eSIM may respectively include different profile PCF data, while sharing the same integrated circuit card identifier (ICCID).

It should be understood that this Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The described embodiments, and the attendant advantages thereof, may best be understood by referencing the corresponding description for the figures identified below, in conjunction with the illustrations in the accompanying drawings. The subject matter depicted in the drawings is included solely for illustrative purposes. As such, it should be understood that various changes in form and detail can be made to the drawings without departing from the spirit and scope of the disclosure.

DETAILED DESCRIPTION

Representative applications and procedures for maintaining electronic subscriber identity modules (eSIMs) at a wireless communication device are described in this section. Additionally, various examples for updating and/or replacing eSIM data for an inactive eSIM of a user equipment (UE) device are also described herein. These examples are provided to add context to, and to aid in the understanding of, the cumulative subject matter of this disclosure. It should be apparent to one having ordinary skill in the field that the present disclosure may be practiced with or without some of the specific details described herein. Further, various modifications or alterations can be made to the subject matter described herein, and illustrated in the corresponding figures, to achieve similar advantages and results, without departing from the spirit and scope of the disclosure.

References are made in this section to the accompanying figures, which form a part of the disclosure and in which are shown, by way of illustration, various implementations corresponding to the described embodiments herein. Although the embodiments and scenarios of this disclosure are described in sufficient detail to enable one having ordinary skill in the field to practice the described implementations, it should be understood that these examples are not to be construed as being overly-limiting or all-inclusive.

In accordance with various embodiments described herein, the terms "wireless communication device," "wireless device," "mobile device," "mobile station," "subscriber device" and "UE," may be used interchangeably herein to describe one or more common electronic computing device(s) that can be capable of performing procedures associated with the embodiments of the disclosure. In accordance with various implementations, any one of these devices may relate to: a cellular phone or a smart phone, a tablet computer, a laptop computer, a notebook computer, a personal computer, a netbook computer, a media player device, an electronic book device, a MiFi® device, a wearable computing device, and electronic machine, as well as any other type of electronic computing device having wireless communication capability.

This wireless communication capability can include communications via one or more common wireless communication protocols, such as that used for communication on a wireless wide area network (WWAN), a wireless metropolitan area network (WMAN), a wireless local area network (WLAN), a wireless personal area network (WPAN), or a near field communication (NFC). In various configurations, the WWAN may relate to a cellular wireless network, including any combination of third generation partnership project (3GPP) second generation (2G), third generation (3G), fourth generation (4G), e.g., long term evolution (LTE) or LTE Advanced (LTE-A), and/or fifth generation (5G) communication technologies, or other present or future advanced cellular communication technologies. Further, in some configurations, the WLAN can include a Wi-Fi wireless communication subsystem or radio that can implement any common Institute of Electrical and Electronics Engineers (IEEE) 802.11 communication technology.

Figure 1:
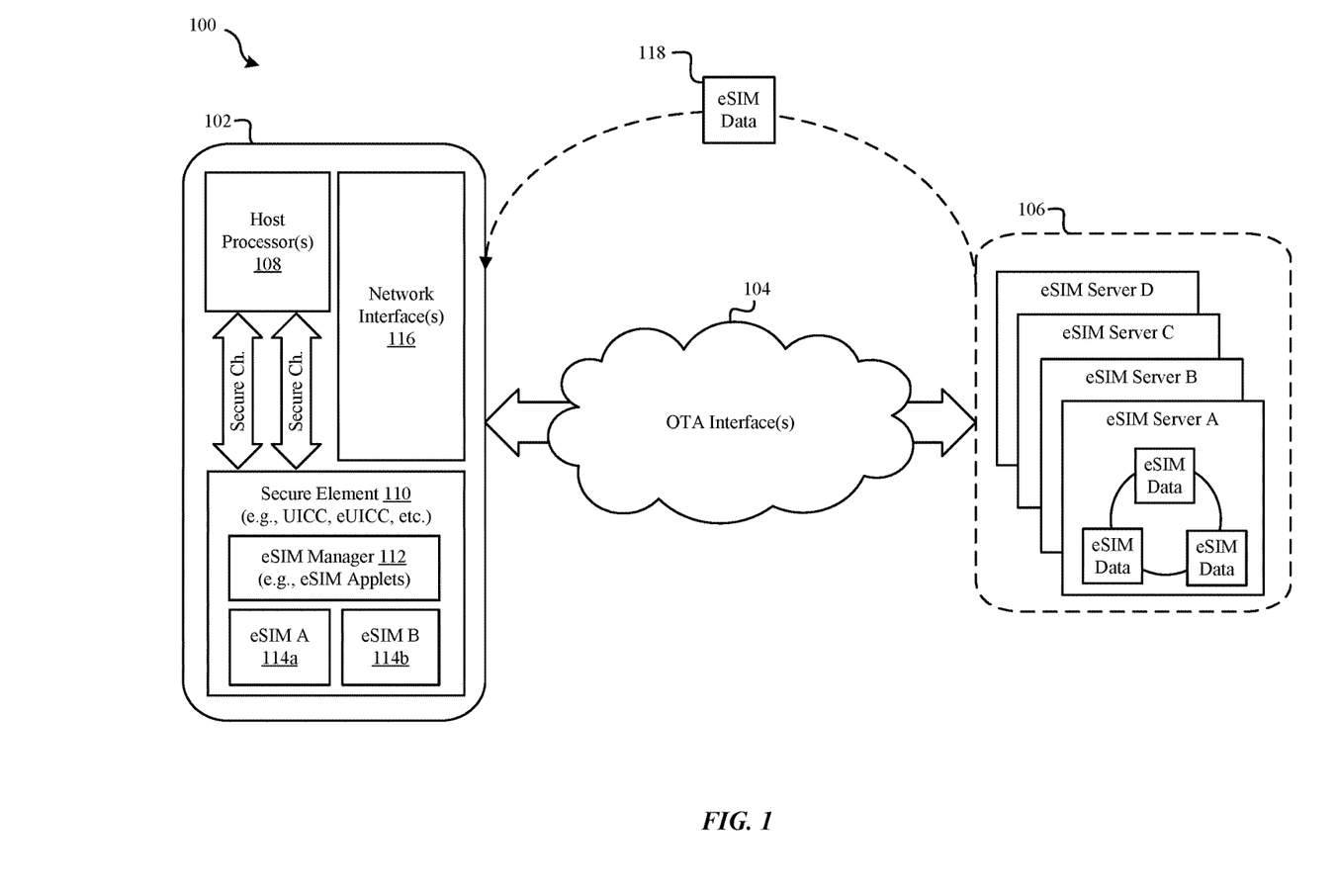
FIG. 1 depicts a network diagram of a user equipment (UE) device and several electronic subscriber identity module (eSIM) servers, in accordance with various embodiments of the disclosure.

It should be apparent that the term "SIM card" may refer to a universal integrated circuit card (UICC), and that an embedded UICC (eUICC) may correspond to an in-device, generally non-removable, hardware component of a UE device that is similarly described as a "secure element" within this disclosure (as depicted in FIG. 1). In this context, a SIM or eSIM may refer to an application (software and/or hardware) component of a secure element, such as at a respectively configured UICC or eUICC. In this regard, it is generally well-known to those skilled in the field that 2G global systems for mobile communications (GSM) technologies employ SIM applications, 3G universal mobile telecommunications system (UMTS) technologies employ USIM applications and ISIM applications for IP multimedia subsystem (IMS) services, and 2G/3G code division multiple access (CDMA) technologies employ CSIM applications.

Regardless of a particular communication technology implementation, the eSIM is purposely described herein in generic terms. Thus, it should be appreciated that an eSIM may have similar application functionality to any of a SIM, USIM, ISIM, CSIM, etc., and as such, the eSIM may be compliant with any number of different radio access technologies, such as those described above, without departing from the spirit and scope of this disclosure. Further, it should be understood that various eSIMs may be provisioned into the secure element of a UE device by an eSIM server associated with a particular mobile network operator (MNO). In this regard, different MNOs may provision one or more proprietary eSIMs to a UE device remotely (e.g., over the Internet), upon request or autonomously and transparent to a user of the UE device.

Further, a provisioned eSIM stored within a secure element of a UE device may be activated via the eSIM server of a corresponding MNO to allow the UE device to communicate using a wireless network associated with that MNO. Alternatively, a provisioned eSIM may remain inactive within the secure element of the UE device for an indefinite period of time, until the inactive eSIM is activated by the MNO to which it is associated. As such, the secure element of a UE device may store any number of inactive eSIMs, but generally speaking, only one eSIM is active at at-a-time for communicating as a subscriber of a particular MNO service. However, in various scenarios, it is contemplated that there may be more than one active eSIM within the secure element of a UE device at a time, such as when one active eSIM is associated with a personal subscriber account and another active eSIM associated with a business or professional subscriber account.

FIG. 1 depicts a network diagram of a UE device 102 capable of communicating with various eSIM servers 106 using one or more over-the-air (OTA) interface(s) 104, in accordance with various embodiments of the disclosure. In some configurations, the UE device 102 may include a network interface component 116 that allows the UE device 102 to communicate using any common types of 2G, 3G, 4G, or 5G cellular communication technologies, as well as any common types of Wi-Fi and Bluetooth communication technologies. In this regard, the OTA interface 104 may correspond to a wireless communication channel between the UE device 102 and one or more network base stations (not shown), including the eSIM servers 106.

The UE device 102 may also include one or more host processor(s) 108 for processing resident application data and IP data for communications with the network interface component 116 via the OTA interface(s) 104. Additionally, the UE device 102 can include a secure element 110 that, in various embodiments, may correspond to a eUICC component. Alternatively, in other configurations, the secure element 110 may correspond to a removable UICC component. It should be understood that the secure element 110 may include secure processor and secure storage/memory components (not shown) that allow the secure element 110 to operate the eSIM manager 112, e.g., one or more eSIM applet application(s), to maintain/manage one or more provisioned eSIMs 114a-b. The eSIMs 114a-b stored in the secure element 110 can be initially provisioned to the UE device 102 by any of the eSIM servers 106.

By way of example, in various embodiments, eSIM server A of the eSIM servers 106 may be associated with a first MNO, and eSIM server B of the eSIM servers 106 may be associated with a second MNO. In one scenario, eSIM server A may provision eSIM A 114a to the UE device 102 via a first wireless network, and the UE device 102 may open a secure channel between the host processor(s) 108 and the secure element 110 to store eSIM A 114a within a secure storage of the secure element 110. In accordance with various implementations, the secure channel can be cryptographically secure (using encryption) at the UE device 102 to prevent access to any eSIM data within the UE device 102 during provisioning. Likewise, the secure element 110 can be cryptographically secure (using encryption) at the UE device 102 to prevent access to any data within the secure element 110 by any on-device or remote hardware and/or software entities.

After eSIM A has been provisioned within the secure element 110 of the UE device 102, eSIM A 114a may be activated by eSIM Server A to enable to UE device 102 to communicate using the wireless network(s) of the first MNO. Later, such as when the UE device 102 is roaming, eSIM server B may provision eSIM B 114b to the UE device 102 via the first wireless network or a second wireless network, and the UE device 102 may open another secure channel between the host processor(s) 108 and the secure element 110 to store eSIM B 114b within the secure storage of the secure element 110. At this time, eSIM A 114a is active and eSIM B 114b is inactive within the secure element 110 of the UE device 102, with eSIM A 114a and eSIM B 114b having been respectively provisioned to the UE device 102 by different MNOs corresponding to eSIM Server A and eSIM Server B.

It should be understood that, in accordance various embodiments, multiple eSIMs of a single MNO may be provisioned to the secure element 110 of the UE device 102, or alternatively (as described in the above scenario), multiple eSIMs of any number of different MNOs may be provisioned to the secure element 110 of the UE device 102 via corresponding eSIM servers 106, using any number of secure communication channels. As will be described further herein with respect to FIGS. 2, 3, 4, and 7, after one or more eSIMs 114a-b have been provisioned to the UE device 102, one of which is an active eSIM (e.g., eSIM A 114a) with the other eSIM(s) being inactive (e.g., eSIM B 114b), various active and inactive eSIMs may be maintained and/or managed at the UE device 102 using the eSIM manager 112. In this regard, the eSIM manager 112 may collaborate with a corresponding eSIM server(s) 106 to update eSIM profile data or to atomically replace one or more inactive eSIMs (collectively referred to as eSIM data 118). This eSIM data 118 can be transferred to the UE device 102 from the eSIM server(s) 106 via the OTA interface(s) 104, in a cryptographically secure (using encryption) manner, to prevent access to the eSIM data 118 by any unintended third parties.

Figure 2:
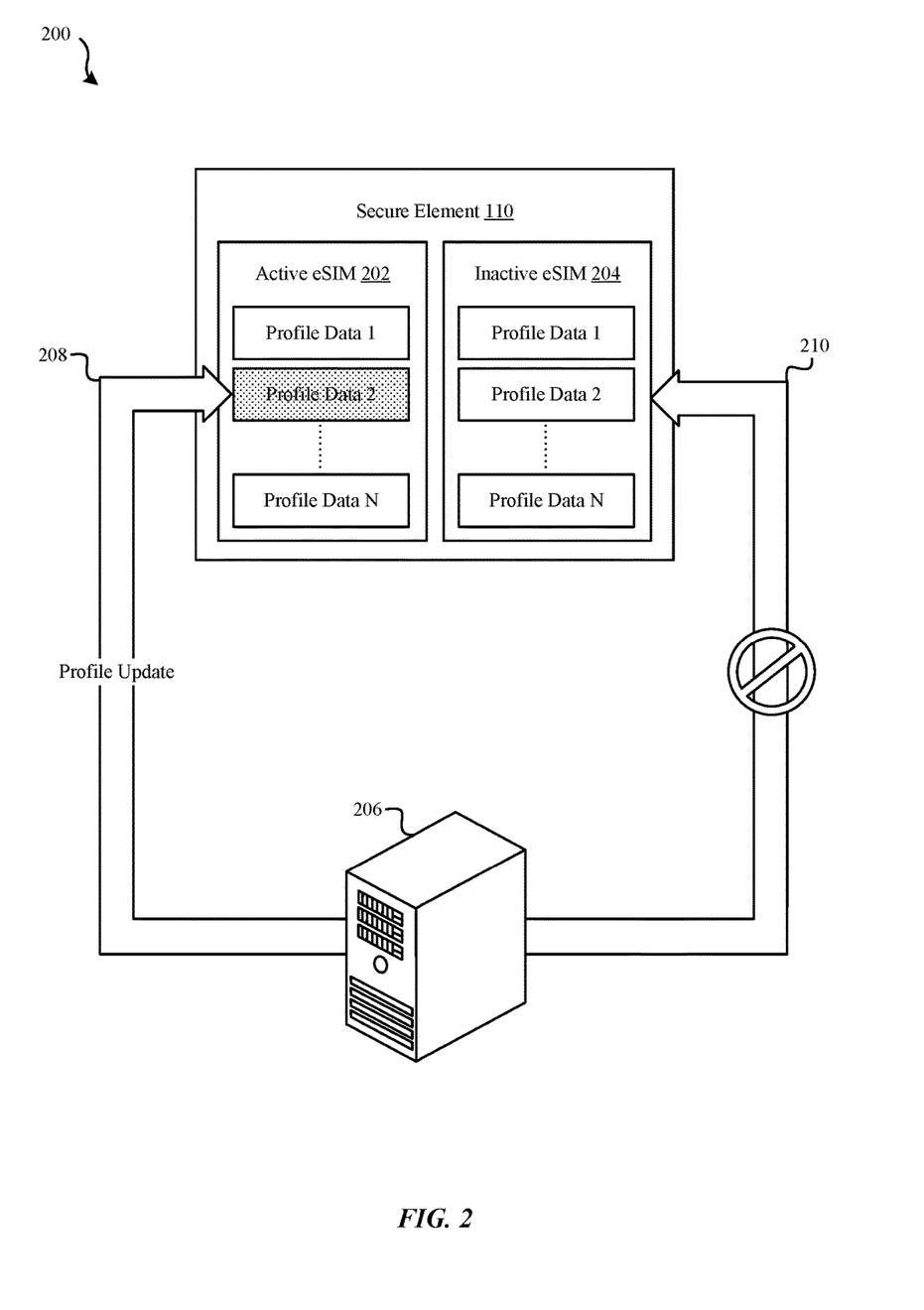
FIG. 2 depicts a profile update procedure being performed at an active eSIM of a secure element of the UE device shown in FIG. 1, in accordance with some embodiments of the disclosure.

FIG. 2 depicts a profile update procedure 200 being performed at an active eSIM 202 of a secure element 110 of the UE device 102 shown in FIG. 1, in accordance with some implementations of the disclosure. It should be understood that the profile update procedure 200 depicted in FIG. 2 may be associated with a method, or methods, that can be implemented by the execution of computer-executable instructions (e.g., computer program code) stored within a non-transitory computer-readable memory, such as the computer-executable instructions of the eSIM manager 112 stored within the memory of the secure element 110 of the UE device 102 and/or the computer-executable instructions stored within the memory of any of the eSIM server(s) 106 depicted in FIG. 1.

In accordance with various embodiments, the term "profile," as used herein, may correspond to file structure data, application data, settings, policies (rule sets), etc., for a particular eSIM of the secure element 110, which are defined by a corresponding MNO that provisioned that eSIM to a UE device 102. As would be understood by those skilled in the field, various eSIM profile data may need to be updated periodically by a MNO's eSIM server 206 (e.g., in collaboration with an eSIM manager 112) to ensure that corresponding access control procedures are properly supported by one or more provisioned eSIM(s) of that MNO. Improperly configured eSIM profile data can detrimentally result in network access and/or communication errors and failures at a UE device 102, depending on the severity and type of eSIM profile data defect(s) present within a secure element 110.

In an embodiment, the profile update procedure 200 of FIG. 2 involves two profile update attempts, 208 and 210, for a UE device 102. It should be understood that the eSIM manager 112 of the secure element 110 or an eSIM server 206 of a particular MNO may initiate this procedure 200, depending on whether the profile update is instigated as a pull or a push-type data acquisition. In either scenario, the profile data of an inactive eSIM 204 stored within the secure element 110 may be traditionally inaccessible for performing profile updates, as shown for attempt 210. For instance, it may be specified that only active eSIMs can be accessed and managed by the eSIM manager 112 of a corresponding eSIM server 206. In this scenario, any attempt 210 to access and update the profile data of an inactive eSIM 204 is prohibited, or would otherwise fail. However, an attempt 208 to access and update the profile data of an active eSIM 202 is allowed and would presumably be successful.

Figure 3:
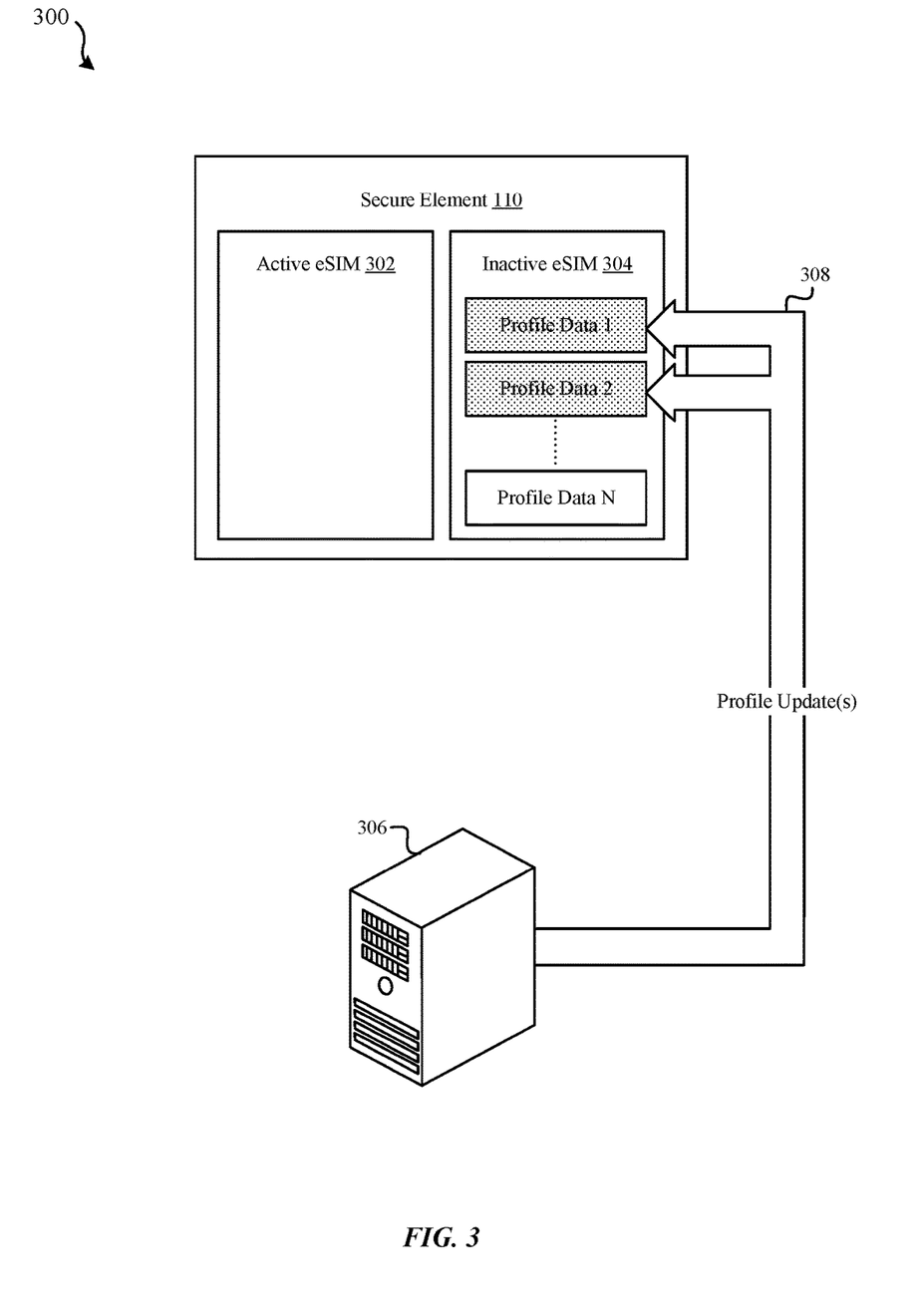
FIG. 3 depicts one or more profile update(s) being performed at an inactive eSIM of a secure element of the UE device shown in FIG. 1, in accordance with some embodiments of the disclosure.

FIG. 3 depicts another profile update procedure 300 being performed at an inactive eSIM 304 of a secure element 110 of the UE device 102 shown in FIG. 1, in accordance with some embodiments of the disclosure. It should be understood that the profile update procedure 300 depicted in FIG. 3 may be associated with a method, or methods, that can be implemented by the execution of computer-executable instructions (e.g., computer program code) stored within a non-transitory computer-readable memory, such as the computer-executable instructions of the eSIM manager 112 stored within the memory of the secure element 110 of the UE device 102 and/or the computer-executable instructions stored within the memory of any of the eSIM server(s) 106 depicted in FIG. 1.

In accordance with some implementations, the profile update procedure 300 of FIG. 3 involves a single profile update 308 for multiple profile data (e.g., profile data 1 and profile data 2) of an inactive eSIM 304 that is stored within the secure element 110 of a UE device 102. In this scenario, no profile updates are performed on the active eSIM 302; however, it can be assumed that the active eSIM 302 is utilized by the UE device 102 to communicate via a wireless network of a corresponding MNO at the same time the profile update 308 for the inactive eSIM 304 is occurring. In this regard, a wireless communication channel (e.g., a cellular telecommunication channel) established between the UE device 102 and the MNO of the active eSIM 302 may be utilized to transfer/download the profile update 308 data for the inactive eSIM 304. This profile update data transfer can occur in the background, such that it is transparent to a user of the UE device 102.

Alternatively, another accessible wired (e.g., via USB connection) or wireless communication channel (e.g., via Wi-Fi) may be utilized by the UE device 102 to perform the inactive eSIM 304 profile update 308, in substantially the same manner. In either communication scenario, the transfer of the profile update 308 for the inactive eSIM 304 from the eSIM server 306 can be configured to be cryptographically secure (encrypted), as previously described. Example methods for performing the profile update 308 for the inactive eSIM 304 (e.g., in a pull scenario or a push scenario) will be respectively described herein with respect to the flow diagrams depicted in FIGS. 5 and 6.

Figure 4:
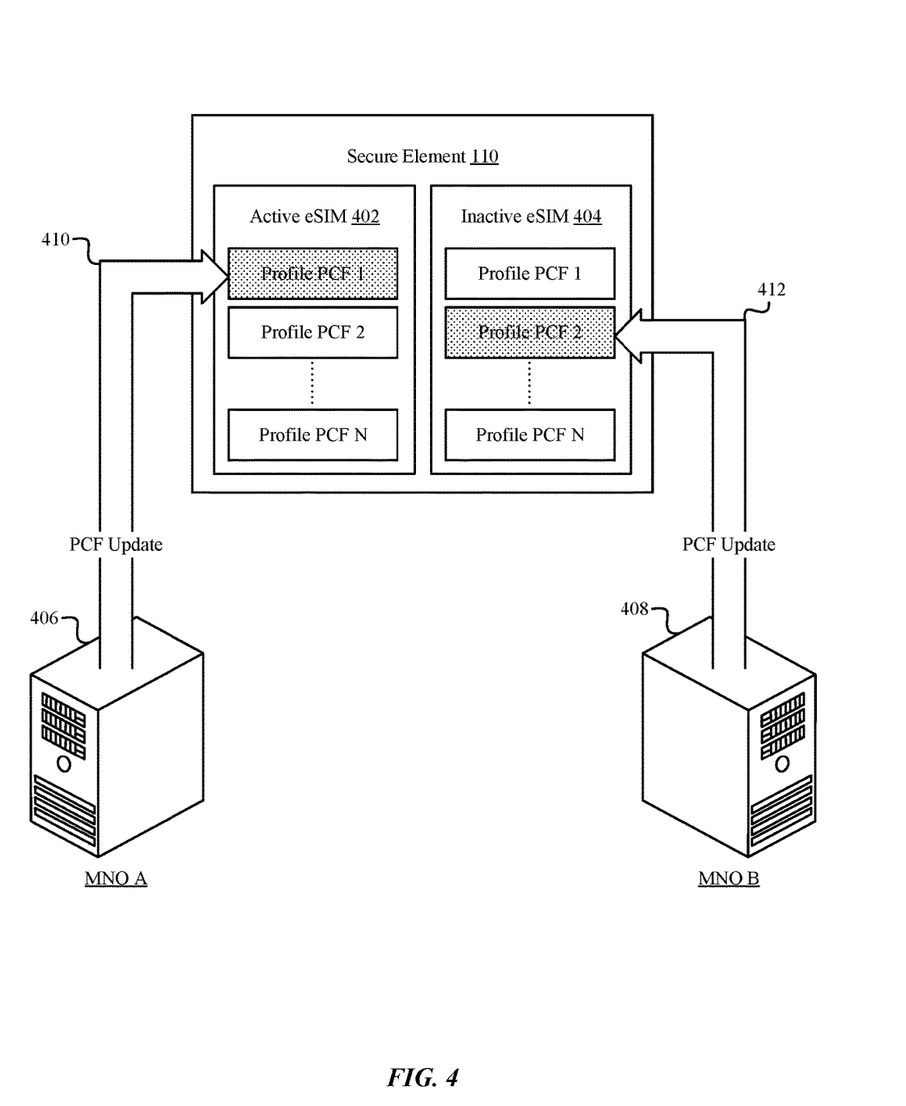
FIG. 4 depicts a profile policy control function (PCF) update being performed at an active eSIM associated with a first service provider and a profile PCF update being performed at an inactive eSIM associated with a second service provider of a secure element of the UE device shown in FIG. 1, in accordance with various embodiments of the disclosure.

FIG. 4 depicts a profile policy control function (PCF) update procedure 400 being performed at an active eSIM 402 associated with a first eSIM server 406 (e.g., of a first MNO) and at an inactive eSIM 404 associated with a second eSIM server 408 (e.g., of a second MNO) of a secure element 110 of the UE device 102 shown in FIG. 1, in accordance with various implementations of the disclosure. It should be understood that the profile PCF update procedure 400 depicted in FIG. 4 may be associated with a method, or methods, that can be implemented by the execution of computer-executable instructions (e.g., computer program code) stored within a non-transitory computer-readable memory, such as the computer-executable instructions of the eSIM manager 112 stored within the memory of the secure element 110 of the UE device 102 and/or the computer-executable instructions stored within the memory of any of the eSIM server(s) 106 depicted in FIG. 1.

In accordance with various implementations, the term "profile PCF," as used herein, may correspond to a function that defines, updates, or removes various policy rules for the purpose of implementing a policy (a set of rules) for a particular eSIM of the secure element 110, which are defined by a corresponding MNO that provisioned that eSIM to a UE device 102. In some embodiments, the eSIM manager 112 of the UE device 102 may be configured to implement or execute one or more PCFs associated with either an active eSIM 402 or an inactive eSIM 404, within the secure element 110. In various configurations, the policy rules affected by a given profile PCF may govern remote file management (RFM) and/or remote application management (RAM) procedures for the active eSIM 402 or the inactive eSIM 404 of the secure element 110 by a corresponding MNO (e.g., a MNO of the first eSIM server 406 or a MNO of the second eSIM server 408).

In accordance with various embodiments, the profile PCF update 410 for the active eSIM 402 of the secure element 110 may emanate from a first eSIM server 406 associated with a first MNO, and the profile PCF update 412 for the inactive eSIM 404 of the secure element 110 may emanate from a second eSIM server 408 associated with a second MNO. This situation may exist where the UE device 102 has been provisioned with multiple eSIMs, e.g., while roaming and/or changing service between two or more different MNOs. As was previously discussed, typically only one eSIM can be active at-a-time within in a secure element 110. Although, the respective profile PCF updates, 410 and 412, for the active eSIM 402 and the inactive eSIM 404 are depicted as occurring in parallel (e.g., at substantially the same time) in FIG. 4, it should be appreciated that these profile PCF updates, 410 and 412, may occur separately, at different times.

One notable feature of the profile PCF update procedure 400 is that multiple MNOs are able to access the secure element 110 of a UE device 102 to perform profile PCF updates, 410 and 412, without negatively impacting communications at the UE device 102. In accordance with various embodiments, the active eSIM 402 may be utilized by the UE device 102 to communicate via a wireless network of a corresponding MNO at the same time the profile PCF update 412 for the inactive eSIM 404 is being performed. In this regard, a wireless communication channel (e.g., a cellular telecommunication channel) established between the UE device 102 and the first MNO of the active eSIM 402 may be utilized to download the profile PCF update 412 data for the inactive eSIM 404. Alternatively, a separate wireless communication channel (e.g., a Wi-Fi channel) may be utilized by the UE device 102 to perform the inactive eSIM 404 profile PCF update 412. In either scenario, the transfer of the profile PCF update 412 for the inactive eSIM 404 can configured to be cryptographically secure (encrypted).

Figure 5:
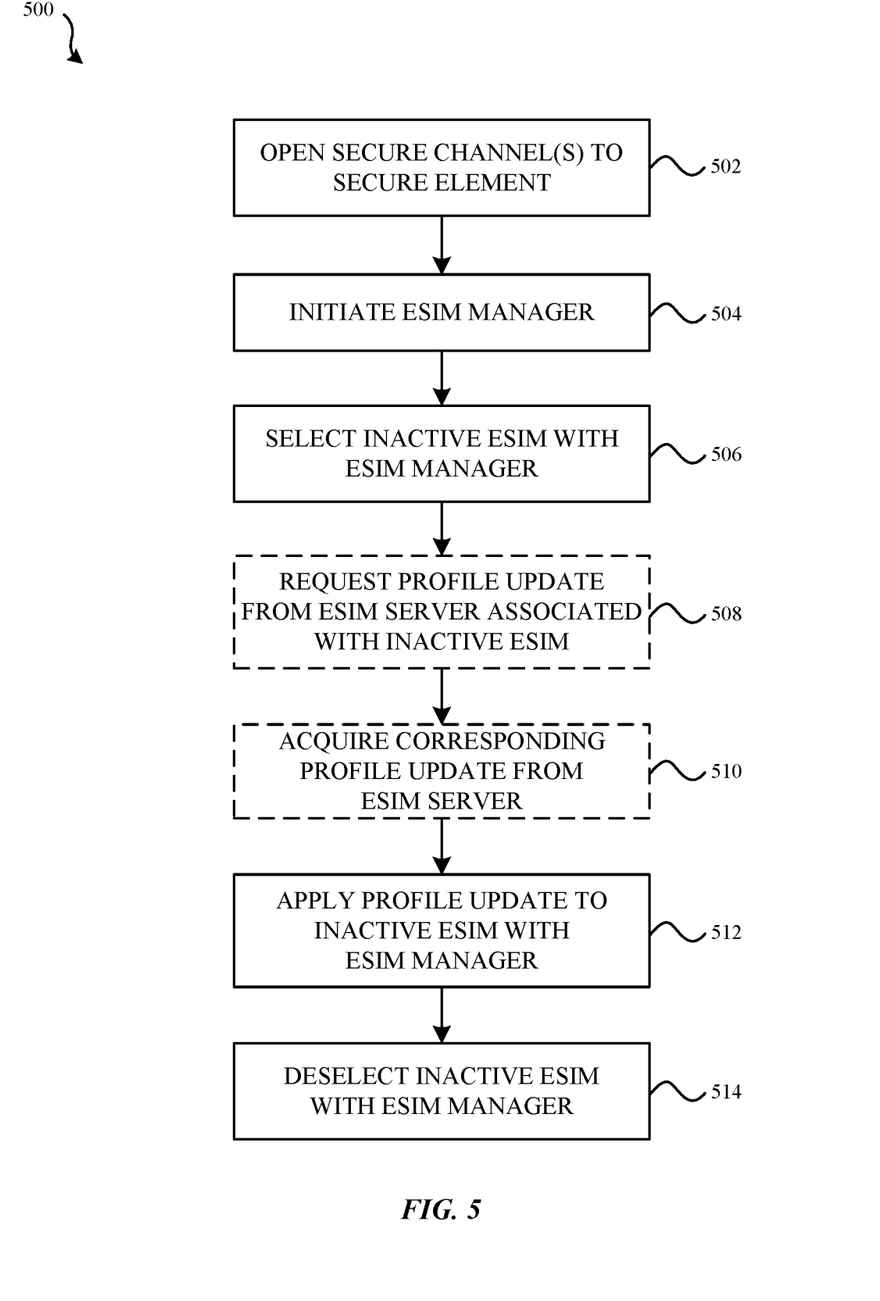
FIG. 5 depicts a flow diagram of a profile data pull procedure that is performed in accordance with various embodiments of the disclosure.

FIG. 5 depicts a flow diagram of a profile data pull procedure 500 that can be performed in accordance with various embodiments of the disclosure. It should be understood that the profile data pull procedure 500 depicted in FIG. 5 may be associated with a method, or methods, that can be implemented by the execution of computer-executable instructions (e.g., computer program code) stored within a non-transitory computer-readable memory, such as the computer-executable instructions of the eSIM manager 112 stored within the memory of the secure element 110 of the UE device 102 depicted in FIG. 1.

Initially, at operation block 502, one or more secure communication channel(s) can be opened between a host processor(s) 108 and a secure element 110 of the UE device 102. In accordance with various embodiments, multiple eSIMs 114a-b and an eSIM manager 112 may be stored within the secure element 110 of the UE device 102. Subsequently, at operation block 504, the eSIM manager 112, which may correspond to an applet application for an inactive eSIM, can be initiated at the UE device 102 within the secure element 110. Then, at operation block 506, the eSIM manager 112 can be configured to select an inactive eSIM associated with a particular MNO, e.g., in accordance with the inactive eSIM's integrated circuit card identifier (ICCID).

Thereafter, at operation block 508, the UE device 102 (e.g., via the eSIM manager 112) can be configured to request profile update data from an eSIM server 106 associated with the inactive eSIM. In response to the request, the UE device 102 (e.g., via the eSIM manager 112) can acquire the corresponding profile update data for the inactive eSIM from the eSIM server. In various embodiments, the procedures of either, or both, operation blocks 508 and 510 may occur prior to any of operation blocks 502, 504, or 506, without departing from the spirit and scope of the disclosure. Accordingly, operation blocks 508 and 510 have been outlined with a dashed line to emphasize this optional reordering of operation steps.

Next, at operation block 512, the eSIM manager 112 can be configured to apply the acquired profile update to the inactive eSIM, e.g., embedding the update therein. After the profile update has been successfully applied to the inactive eSIM, the eSIM manager 112 can deselect the updated, inactive eSIM at operation block 514.

Figure 6:
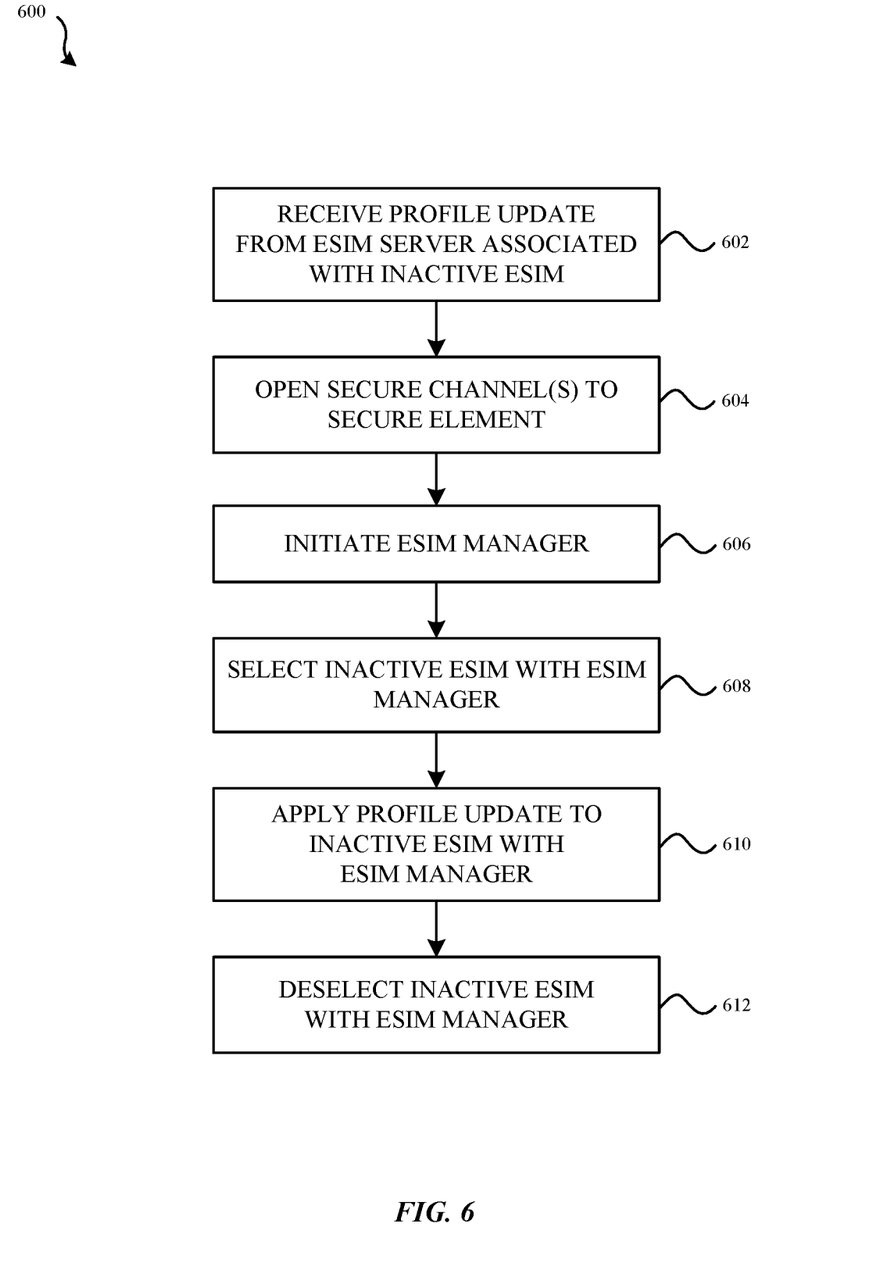
FIG. 6 depicts a flow diagram of a profile data push procedure that is performed in accordance with some embodiments of the disclosure.

FIG. 6 depicts a flow diagram of a profile data push procedure 600 that can be performed in accordance with some implementations of the disclosure. It should be understood that the profile data push procedure 600 depicted in FIG. 6 may be associated with a method, or methods, that can be implemented by the execution of computer-executable instructions (e.g., computer program code) stored within a non-transitory computer-readable memory, such as the computer-executable instructions stored within the memory of any of the eSIM server(s) 106 and/or the computer-executable instructions of the eSIM manager 112 stored within the memory of the secure element 110 of the UE device 102 depicted in FIG. 1.

At operation block 602, the UE device 102 (e.g., via the eSIM manager 112) can receive a profile data update for an inactive eSIM from an eSIM server that is associated with a MNO that provisioned the inactive eSIM to the secure element 110 of the UE device 102. Then, at operation block 604, one or more secure communication channel(s) can be opened between a host processor(s) 108 and the secure element 110 of the UE device 102. Subsequently, at operation block 606, the eSIM manager 112, which may correspond to an applet application for the inactive eSIM, can be initiated at the UE device 102 within the secure element 110.

Next, at operation block 608, the eSIM manager 112 can be configured to select an inactive eSIM associated with the MNO, e.g., in accordance with the inactive eSIM's integrated circuit card identifier (ICCID). Then, at operation block 610, the eSIM manager 112 can be configured to apply the acquired profile update to the inactive eSIM. After the profile update has been successfully applied to the inactive eSIM, the eSIM manager 112 can deselect the updated, inactive eSIM at operation block 612.

In accordance with some embodiments of the disclosure, a UE device 102 can establish communications with a first network using an active eSIM of multiple eSIMs 114, and then initiate an eSIM manager 112 to: select an inactive eSIM of the multiple eSIMs 114, apply a profile update to the inactive eSIM during communications with the first network, and then deselect the inactive eSIM when the profile update to the inactive eSIM is complete. Further, as described above, a secure channel can be established between a host processor(s) 108 and a secure element 110 of the UE device 102, prior to accessing any data stored within the secure element 110, to apply the profile update to the inactive eSIM in a secure manner.

In one implementation, the secure channel may be an in-device communication channel that is otherwise inaccessible to other components (software and/or hardware) of the UE device 102, and more than one secure channel may be open between the host processor(s) 108 and the secure element 110 at-a-time within the UE device 102. In some embodiments, the profile update can correspond to one or more PCF updates of the inactive eSIM.

Further, the UE device 102 may request the profile update from an eSIM server of a second network that is associated with the inactive eSIM, and in response to requesting the profile update, acquire the profile update from the eSIM server of the second network. In this arrangement, the first network can correspond to a first MNO that provisioned the active eSIM to the UE device 102, and the second network may correspond to a second MNO that provisioned the inactive eSIM to the UE device 102.

In other embodiments, the UE device 102 can receive the profile update from an eSIM server of a second network that is associated with the inactive eSIM, and in response to receiving the profile update from the eSIM server, establish a secure channel between a host processor(s) 108 of the UE device 102 and the secure element 110 of the UE device 102 storing the multiple eSIMs, to apply the profile update to the inactive eSIM in a secure manner.

In various configurations, a profile update or a profile PCF update can be applied to an inactive eSIM (or an active eSIM) with the eSIM manager 112 using a separate specification that defines the profile update, or alternatively, with corresponding command application protocol data units (APDUs) that are associated with the inactive eSIM.

In accordance with other implementations, a wireless communication device can be configured to maintain multiple eSIMs. The wireless communication device may include one or more processors, a secure element storing the multiple eSIMs, and a non-volatile computer-readable storage medium storing executable instructions. When the executable instructions are executed by the one or more processors, the wireless communication device may establish a secure channel between the one or more processors and the secure element, initiate an eSIM manager associated with an inactive eSIM of the multiple eSIMs at the wireless communication device, select the inactive eSIM and apply a profile update to the inactive eSIM with the eSIM manager, and then deselect the inactive eSIM with the eSIM manager when the profile update to the inactive eSIM is complete.

In some embodiments, execution of the executable instructions can further cause the wireless communication device to establish communications with a first MNO using an active eSIM of the multiple eSIMs, and then apply the profile update to the inactive eSIM with the eSIM manager during communications with the first MNO. In this regard, the active eSIM may have been provisioned to the wireless communication device by an eSIM server of the first MNO, and the inactive eSIM may have been provisioned to the wireless communication device by an eSIM server of a second MNO.

In other embodiments, execution of the executable instructions may cause the wireless communication device to request the profile update from a MNO associated with the inactive eSIM, and then acquire the profile update from the MNO associated with the inactive eSIM, in response to the request. In some implementations, execution of the executable instructions further causes the wireless communication device to receive the profile update from a MNO associated with the inactive eSIM. In this regard, the wireless communication device can establish the secure channel between the one or more processors and the secure element in response to receiving the profile update from the MNO associated with the inactive eSIM.

In some implementations, the profile update may correspond to one or more profile PCF updates of the inactive eSIM, and the one or more PCF updates can be applied to the inactive eSIM with the eSIM manager using a separate specification that defines the one or more PCF updates, or alternatively, with corresponding command APDUs that are associated with the inactive eSIM.

Figure 7:
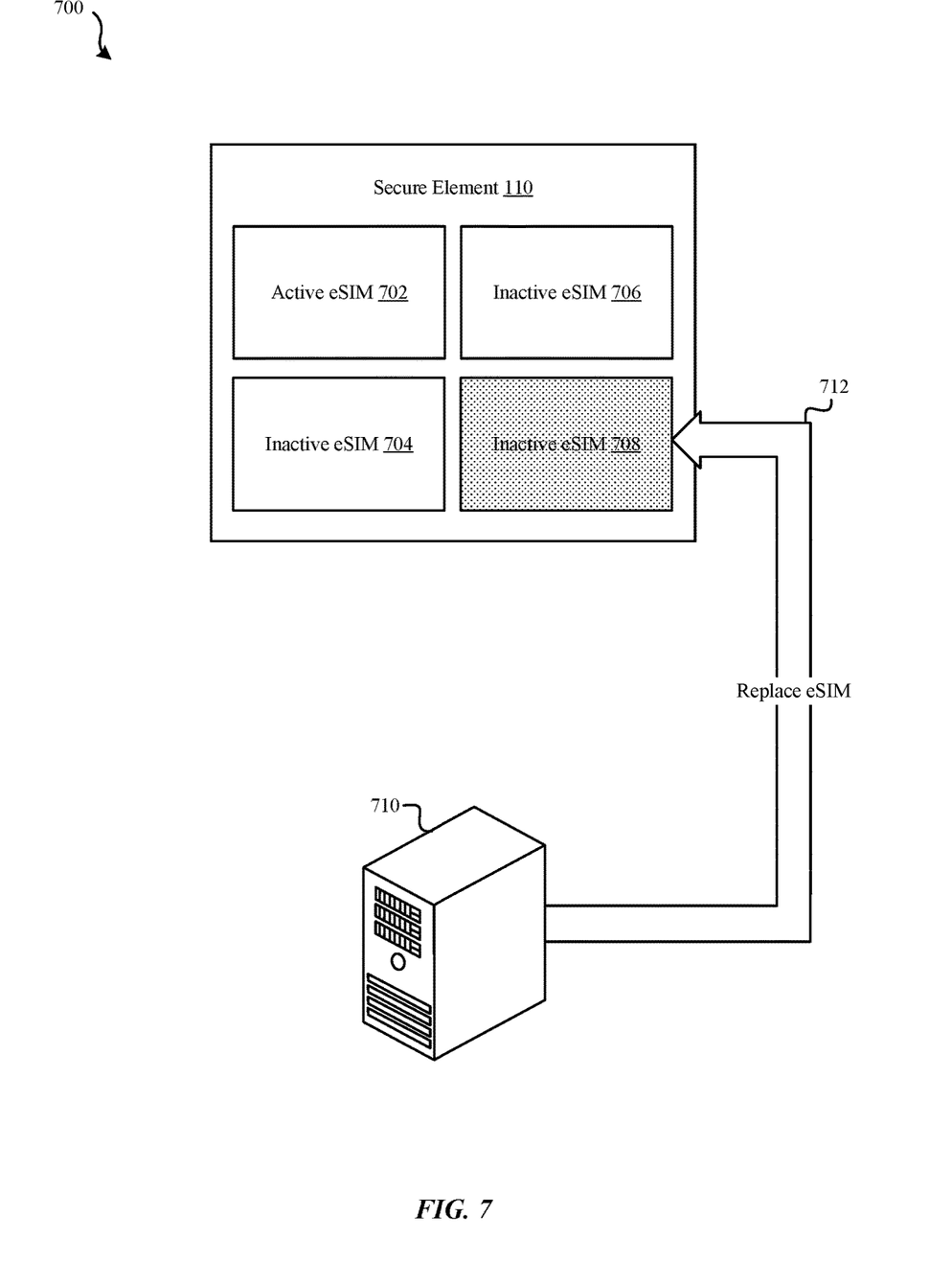
FIG. 7 depicts an inactive eSIM replacement procedure being performed at a secure element of the UE device shown in FIG. 1, in accordance with various embodiments of the disclosure.

FIG. 7 depicts an inactive eSIM replacement procedure 700 being performed at a secure element 110 of the UE device 102 shown in FIG. 1, in accordance with various embodiments of the disclosure. It should be understood that the inactive eSIM replacement procedure 700 depicted in FIG. 7 may be associated with a method, or methods, that can be implemented by the execution of computer-executable instructions (e.g., computer program code) stored within a non-transitory computer-readable memory, such as the computer-executable instructions of the eSIM manager 112 stored within the memory of the secure element 110 of the UE device 102 and/or the computer-executable instructions stored within the memory of any of the eSIM server(s) 106 depicted in FIG. 1.

In accordance with some implementations, a secure element 110 of a UE device 102 may be provisioned with various eSIMs by an eSIM server(s) associated with one or more MNOs. By way of example, the secure element 110 can include one active eSIM 702 and multiple inactive eSIMs, 704, 706, and 708. In this configuration, only one provisioned eSIM may be allowed to be active at-a-time. At some point in time, the eSIM manager 112 of the secure element 110 of the UE device 102 and/or an eSIM server 710 associated with MNO that provisioned an inactive eSIM 708 to the UE device 102 may determine that the corresponding inactive eSIM 708 is improperly configured, defective, or outmoded by a newer version of the inactive eSIM 708.

In this scenario, it may be more desirable to replace the entire inactive eSIM 708, as opposed to trying to correct/update its faulty data. For example, attempting to update a faulty eSIM may, in some scenarios, result in network access and/or communication errors and failures at a UE device 102, depending on the severity and type of eSIM defect(s) present within a secure element 110. To remedy this situation, the eSIM server 710 associated with the identified, inactive eSIM 708 may coordinate with the eSIM manager 112 to provision a replacement eSIM 712 for the inactive eSIM 708 to the UE device 102. The processes associated with performing this procedure are described herein with respect to the flow diagram depicted in FIG. 8. In accordance with various embodiments, the inactive eSIM replacement procedure can be configured to be atomic. In this regard, bundled operations at the eSIM manager 112 may prevent the loss of any inactive eSIM data prior to the successful installation and/or verification of a replacement eSIM at the secure element 110 of the UE device 102.

Figure 8:
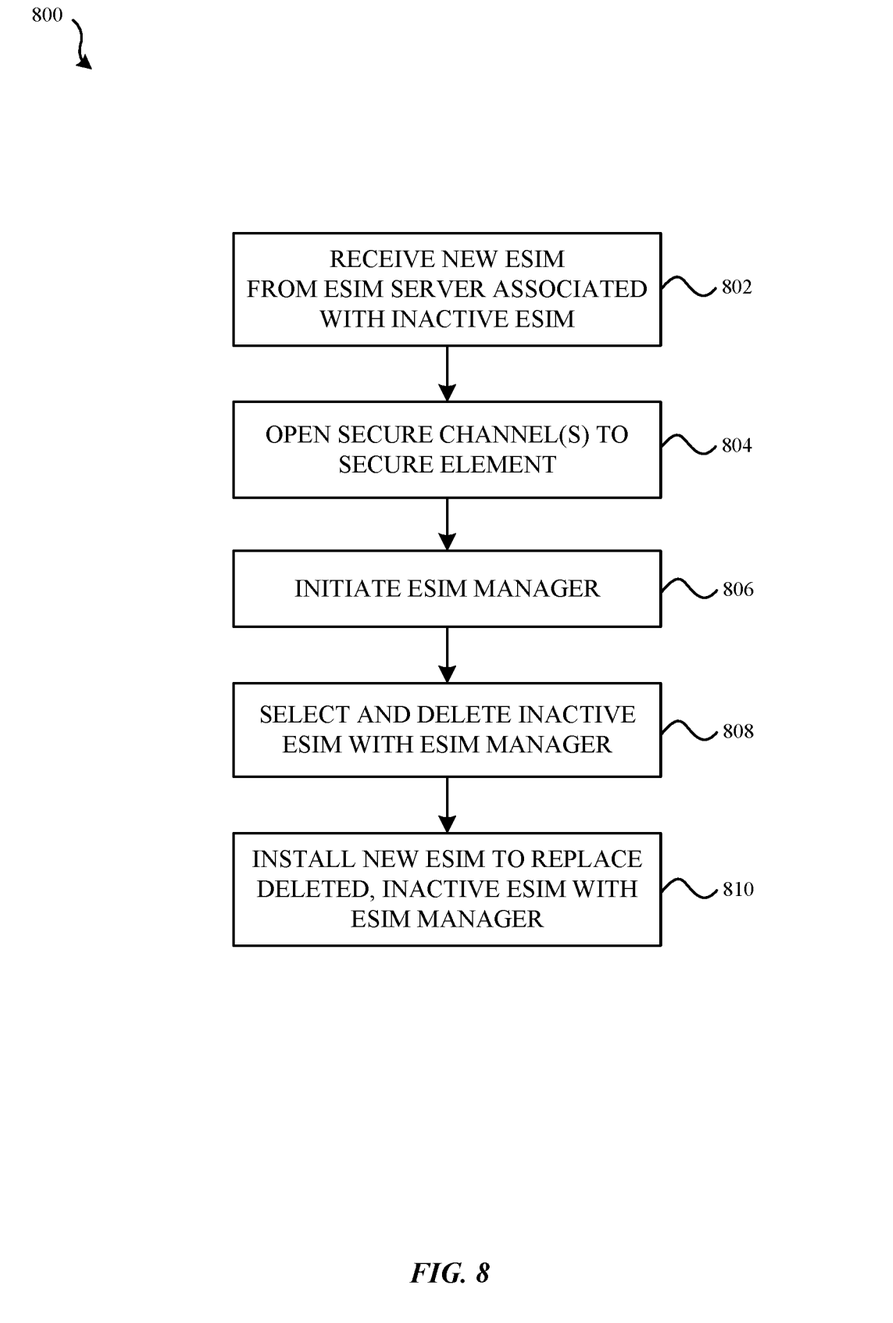
FIG. 8 depicts a flow diagram of an inactive eSIM replacement procedure that is performed in accordance with some embodiments of the disclosure.

FIG. 8 depicts a flow diagram of an inactive eSIM replacement procedure 800 that is performed in accordance with some implementations of the disclosure. It should be understood that the inactive eSIM replacement procedure 800 depicted in FIG. 8 may be associated with a method, or methods, that can be implemented by the execution of computer-executable instructions (e.g., computer program code) stored within a non-transitory computer-readable memory, such as the computer-executable instructions stored within the memory of any of the eSIM server(s) 106 and/or the computer-executable instructions of the eSIM manager 112 stored within the memory of the secure element 110 of the UE device 102 depicted in FIG. 1.

Initially, at operation block 802, a UE device 102 can receive a new, replacement eSIM 712 from an eSIM server 710 of a MNO associated with an inactive eSIM 708 that is determined to be problematic, or is otherwise in need of replacement. Subsequently, at operation block 804, one or more secure communication channel(s) can be opened between a host processor(s) 108 and a secure element 110 of the UE device 102. Then, at operation block 806, the eSIM manager 112, which may correspond to an applet application for an inactive eSIM, can be initiated at the UE device 102 within the secure element 110.

Next, at operation block 808, the eSIM manager 112 can be configured to select and then delete the inactive eSIM 708 associated with a particular MNO, e.g., in accordance with the inactive eSIM's 708 integrated circuit card identifier (ICCID). Thereafter, at operation block 810, the eSIM manager 112 can be configured to install the new, replacement eSIM 712 to replace the deleted, inactive eSIM 708. It should be understood that, in various embodiments, the inactive eSIM 708 may not be completely deleted from the secure element 110 of the UE device 102 until the replacement eSIM 712 has been correctly installed within the secure element 110 of the UE device 102 and/or verified by the eSIM manager 112.

In accordance with some implementations, a UE device 102 can be configured to establish communications with a first network using an active eSIM of multiple eSIMs 114a-b, acquire a replacement eSIM for an inactive eSIM of the multiple eSIMs 114a-b, where the replacement eSIM and the inactive eSIM are associated with a second network, initiate an eSIM manager 112 at the UE device 102, select and delete the inactive eSIM, and then install the replacement eSIM. In some embodiments, acquiring the replacement eSIM for the inactive eSIM may further include the UE device 102 being configured to receive the replacement eSIM from an eSIM server of the second network, and then establish a secure channel between a host processor(s) 108 of the UE device 102 and the secure element 110 of the UE device 102 to install the replacement eSIM in a secure manner.

In some configurations, the eSIM manager 112 and the multiple eSIMs 114a-b, including the replacement eSIM, can be stored within the secure element 110 of the UE device 102. Further, the inactive eSIM may be deleted only after the functionality and/or appropriateness of the replacement eSIM has been verified. In other configurations, the inactive eSIM and the replacement eSIM may respectively include different profile PCF data, while sharing the same integrated circuit card identifier (ICCID).

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the field that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the field that many modifications and variations are possible in view of the above teachings.

What is claimed is:

1. A method for maintaining a plurality of electronic subscriber identity modules (eSIMs) at a user equipment (UE) device, the method comprising:
at the UE device:
establishing communications with a first network using an active eSIM of the plurality of eSIMs;
initiating an eSIM manager at the UE device;
selecting an inactive eSIM of the plurality of eSIMs with the eSIM manager;
applying a profile update to the inactive eSIM with the eSIM manager, while the inactive eSIM remains inactive, during communications with the first network; and
deselecting the inactive eSIM with the eSIM manager when the profile update to the inactive eSIM is complete.

2. The method of claim 1, wherein:
the eSIM manager and the plurality of eSIMs are stored within a secure element of the UE device; and
the method further comprises establishing a secure channel between a host processor of the UE device and the secure element to apply the profile update to the inactive eSIM in a secure manner.

3. The method of claim 1, wherein the profile update corresponds to one or more profile policy control function (PCF) updates of the inactive eSIM.

4. The method of claim 1, further comprising:
requesting the profile update from an eSIM server of a second network that is associated with the inactive eSIM; and
in response to requesting the profile update, acquiring the profile update from the eSIM server of the second network.

5. The method of claim 4, wherein the first network corresponds to a first mobile network operator (MNO) that provisioned the active eSIM to the UE device, and the second network corresponds to a second MNO that provisioned the inactive eSIM to the UE device.

6. The method of claim 1, further comprising receiving the profile update from an eSIM server of a second network that is associated with the inactive eSIM.

7. The method of claim 6, further comprising, in response to receiving the profile update from the eSIM server, establishing a secure channel between a host processor of the UE device and a secure element of the UE device storing the plurality of eSIMs to apply the profile update to the inactive eSIM in a secure manner.

8. The method of claim 1, wherein the profile update is applied to the inactive eSIM with the eSIM manager using a separate specification that defines the profile update or using corresponding command application protocol data units (APDUs) that are associated with the inactive eSIM.

9. A wireless communication device that is configured to maintain a plurality of electronic subscriber identity modules (eSIMs), the wireless communication device comprising:
one or more processors;
a secure element storing the plurality of eSIMs; and
a non-volatile computer-readable storage medium storing executable instructions that, when executed by the one or more processors, cause the wireless communication device to:
establish a secure channel between the one or more processors and the secure element;
initiate an eSIM manager associated with an inactive eSIM of the plurality of eSIMs at the wireless communication device;
select the inactive eSIM and apply a profile update to the inactive eSIM with the eSIM manager while the inactive eSIM remains inactive; and
deselect the inactive eSIM with the eSIM manager when the profile update to the inactive eSIM is complete.

10. The wireless communication device of claim 9, wherein execution of the executable instructions further causes the wireless communication device to:
establish communications with a first mobile network operator (MNO) using an active eSIM of the plurality of eSIMs; and
apply the profile update to the inactive eSIM with the eSIM manager during communications with the first MNO.

11. The wireless communication device of claim 10, wherein the active eSIM was provisioned to the wireless communication device by an eSIM server of the first MNO, and the inactive eSIM was provisioned to the wireless communication device by an eSIM server of a second MNO.

12. The wireless communication device of claim 9, wherein execution of the executable instructions further causes the wireless communication device to:
request the profile update from a mobile network operator (MNO) associated with the inactive eSIM; and
in response to requesting the profile update, acquire the profile update from the MNO associated with the inactive eSIM.

13. The wireless communication device of claim 9, wherein execution of the executable instructions further causes the wireless communication device to receive the profile update from a mobile network operator (MNO) associated with the inactive eSIM.

14. The wireless communication device of claim 13, wherein the wireless communication device establishes the secure channel between the one or more processors and the secure element in response to receiving the profile update from the MNO associated with the inactive eSIM.

15. The wireless communication device of claim 9, wherein:
the profile update corresponds to one or more profile policy control function (PCF) updates of the inactive eSIM; and
the one or more PCF updates are applied to the inactive eSIM with the eSIM manager using a separate specification that defines the one or more PCF updates or using corresponding command application protocol data units (APDUs) that are associated with the inactive eSIM.

16. An apparatus configurable for operation in a wireless communication device, the apparatus comprising:
a processor; and
a memory storing instructions that, when executed by the processor, cause the wireless communication device to:
establish a secure channel between the processor and a secure element;
initiate an eSIM manager associated with an inactive eSIM of a plurality of eSIMs at the wireless communication device;
select the inactive eSIM and apply a profile update to the inactive eSIM with the eSIM manager while the inactive eSIM remains inactive; and
deselect the inactive eSIM with the eSIM manager when the profile update to the inactive eSIM is complete.

17. The apparatus of claim 16, wherein execution of the instructions further causes the wireless communication device to:
establish communications with a first mobile network operator (MNO) using an active eSIM of the plurality of eSIMs; and
apply the profile update to the inactive eSIM with the eSIM manager during communications with the first MNO.

18. The apparatus of claim 17, wherein the active eSIM was provisioned to the wireless communication device by an eSIM server of the first MNO, and the inactive eSIM was provisioned to the wireless communication device by an eSIM server of a second MNO.

19. The apparatus of claim 16, wherein execution of the instructions further causes the wireless communication device to:
request the profile update from a mobile network operator (MNO) associated with the inactive eSIM; and
in response to requesting the profile update, acquire the profile update from the MNO associated with the inactive eSIM.

20. The apparatus of claim 16, wherein:
the profile update corresponds to one or more profile policy control function (PCF) updates of the inactive eSIM; and
the one or more PCF updates are applied to the inactive eSIM with the eSIM manager using a separate specification that defines the one or more PCF updates or using corresponding command application protocol data units (APDUs) that are associated with the inactive eSIM.

* * * * *